US010153829B2

(12) United States Patent
Jalali et al.

(10) Patent No.: US 10,153,829 B2
(45) Date of Patent: Dec. 11, 2018

(54) GROUND TERMINAL AND UAV BEAM POINTING IN AN UNMANNED AERIAL VEHICLE (UAV) FOR NETWORK ACCESS

(71) Applicant: Bridgewest Finance LLC, San Diego, CA (US)

(72) Inventors: Ahmad Jalali, San Diego, CA (US); Viktor Filiba, Del Mar, CA (US)

(73) Assignee: Bridgewest Finance LLC, San Diego, CA (US)

( * ) Notice: Subject to any disclaimer, the term of this patent is extended or adjusted under 35 U.S.C. 154(b) by 0 days.

(21) Appl. No.: 15/601,749

(22) Filed: May 22, 2017

(65) Prior Publication Data

US 2018/0034534 A1 Feb. 1, 2018

Related U.S. Application Data

(63) Continuation of application No. 15/260,049, filed on Sep. 8, 2016, now Pat. No. 9,660,718, which is a
(Continued)

(51) Int. Cl.
*H04W 24/10* (2009.01)
*H04B 7/185* (2006.01)
(Continued)

(52) U.S. Cl.
CPC ....... *H04B 7/18504* (2013.01); *B64C 39/024* (2013.01); *H04W 16/28* (2013.01);
(Continued)

(58) Field of Classification Search
CPC ................ H04B 7/18504; H04W 24/10
(Continued)

(56) References Cited

U.S. PATENT DOCUMENTS 3,568,197 A 3/1971 Harold
3,780,303 A 12/1973 Smith et al.
(Continued)

FOREIGN PATENT DOCUMENTS

CA 2316440 A1 2/2001
EP 2369361 A1 9/2011
(Continued)

OTHER PUBLICATIONS

Abbott H., et al., "Land-Vehicle Navigation Using GPS" Proceedings of the IEEE, 1999, vol. 87(1), pp. 145-162.
(Continued)

*Primary Examiner* — John J Lee
(74) *Attorney, Agent, or Firm* — Klein, O'Neill & Singh, LLP

(57) ABSTRACT

Systems and methods for detecting an unmanned aerial vehicle (UAV). Network access (for example, to the Internet) may be provided by detecting a UAV and fixing one or more beams from one or more ground terminals to the UAV. In one embodiment, the detection of a UAV includes forming and pointing beams from a ground terminal and ground gateways toward the UAV. The ground terminal may be configured to autonomously steer its antenna beam during initial installation to detect the reference signal from a UAV. In one variant, the ground terminals are steered to more finely track the position of the UAV based on a signal quality metric such as received signal strength and the UAV real-time position location coordinates. In one embodiment, the ground terminal antenna is initially manually pointed toward the UAV, and thereafter allowed to automatically steer to track the position of the UAV. In another embodiment the UAV antenna is steered toward a ground terminal using signal qualify received from the ground terminal and real-time position coordinates and orientation of the UAV.

20 Claims, 9 Drawing Sheets

Related U.S. Application Data continuation-in-part of application No. 14/711,427, filed on May 13, 2015, now Pat. No. 9,590,720.

(51) Int. Cl.
*H04W 64/00* (2009.01)
*H04W 16/28* (2009.01)
*B64C 39/02* (2006.01)
*H04W 84/00* (2009.01)

(52) U.S. Cl.
CPC ......... *H04W 24/10* (2013.01); *H04W 64/006* (2013.01); *B64C 2201/022* (2013.01); *B64C 2201/122* (2013.01); *H04W 84/005* (2013.01)

(58) Field of Classification Search
USPC .............. 455/419, 420, 434, 515, 431, 67.11
See application file for complete search history.

(56) References Cited

U.S. PATENT DOCUMENTS

| | | |
|---|---|---|
| 3,891,985 A | 6/1975 | Oigarden et al. |
| 4,209,695 A | 6/1980 | Arnold et al. |
| 4,278,885 A | 7/1981 | Von Alfthan et al. |
| 4,317,993 A | 3/1982 | Hertzog, Jr. et al. |
| 4,365,154 A | 12/1982 | Arnold et al. |
| 4,387,302 A | 6/1983 | Givens |
| 4,499,380 A | 2/1985 | Aggour et al. |
| 4,851,687 A | 7/1989 | Ettinger et al. |
| 5,021,664 A | 6/1991 | Hinshaw |
| 5,068,532 A | 11/1991 | Wormald et al. |
| 5,076,993 A | 12/1991 | Sawa et al. |
| 5,098,640 A | 3/1992 | Gozani et al. |
| 5,239,568 A | 8/1993 | Grenier |
| 5,241,544 A | 8/1993 | Jasper et al. |
| 5,521,817 A | 5/1996 | Burdoin et al. |
| 5,561,434 A | 10/1996 | Yamazaki |
| 5,712,885 A | 1/1998 | Sowerby et al. |
| 5,832,379 A | 11/1998 | Mallinckrodt |
| 5,995,494 A | 11/1999 | Horikawa |
| 6,018,659 A | 1/2000 | Ayyagari et al. |
| 6,034,634 A | 3/2000 | Karlsson et al. |
| 6,044,323 A | 3/2000 | Yee et al. |
| 6,061,562 A | 5/2000 | Martin et al. |
| 6,108,538 A | 8/2000 | Blasiak et al. |
| 6,144,032 A | 11/2000 | Gazdzinski |
| 6,256,476 B1 | 7/2001 | Beamish et al. |
| 6,281,838 B1 | 8/2001 | Hong |
| 6,513,758 B1 | 2/2003 | Lloyd |
| 6,594,509 B1 | 7/2003 | Takakusaki et al. |
| 6,628,941 B2 | 9/2003 | Knoblach et al. |
| 6,718,161 B1 | 4/2004 | Westall et al. |
| 6,756,937 B1 | 6/2004 | Chang et al. |
| 6,856,803 B1 | 2/2005 | Gross et al. |
| 6,873,301 B1 | 3/2005 | Lopez |
| 7,095,376 B1 | 8/2006 | Timothy et al. |
| 7,212,170 B1 | 5/2007 | Dean et al. |
| 7,777,674 B1 | 8/2010 | Haddadin et al. |
| 8,078,162 B2 | 12/2011 | Deaton et al. |
| 8,116,763 B1 | 2/2012 | Olsen |
| 8,183,999 B1 | 5/2012 | Giallorenzi et al. |
| 8,190,147 B2 | 5/2012 | Kauffman et al. |
| 8,558,734 B1 | 10/2013 | Piesinger |
| 8,897,770 B1 | 11/2014 | Frolov et al. |
| 9,100,086 B1 | 8/2015 | Olsen |
| 9,119,179 B1 | 8/2015 | Firoiu et al. |
| 9,488,981 B2 | 11/2016 | Pillai et al. |
| 9,590,720 B2 | 3/2017 | Jalali |
| 9,614,608 B2 | 4/2017 | Jalali et al. |
| 2002/0061730 A1 | 5/2002 | Hart et al. |
| 2002/0168974 A1 | 11/2002 | Rosen et al. |
| 2003/0040274 A1 | 2/2003 | Dai et al. |
| 2003/0095067 A1 | 5/2003 | Howell |
| 2003/0223354 A1 | 12/2003 | Olszewski |
| 2004/0038658 A1 | 2/2004 | Gurelli et al. |
| 2004/0152480 A1 | 8/2004 | Willars et al. |
| 2005/0035897 A1 | 2/2005 | Perl et al. |
| 2005/0107077 A1 | 5/2005 | Hintermeier et al. |
| 2005/0108374 A1 | 5/2005 | Pierzga et al. |
| 2005/0143005 A1 | 6/2005 | Moore, III |
| 2005/0243005 A1 | 11/2005 | Rafi et al. |
| 2005/0264438 A1 | 12/2005 | Fullerton et al. |
| 2006/0009262 A1 | 1/2006 | Hamm |
| 2006/0063566 A1 | 3/2006 | Maruta |
| 2006/0238411 A1 | 10/2006 | Fullerton et al. |
| 2007/0032246 A1 | 2/2007 | Feher |
| 2007/0090990 A1 | 4/2007 | Nelson |
| 2007/0184849 A1 | 8/2007 | Zheng |
| 2007/0224931 A1 | 9/2007 | Fitton et al. |
| 2007/0230419 A1 | 10/2007 | Raman et al. |
| 2007/0281705 A1 | 12/2007 | Bosenbecker |
| 2008/0090606 A1 | 4/2008 | Hwang et al. |
| 2008/0117858 A1 | 5/2008 | Kauffman |
| 2008/0233865 A1 | 9/2008 | Malarky et al. |
| 2009/0092072 A1 | 4/2009 | Imamura et al. |
| 2009/0209277 A1 | 8/2009 | Pinchas et al. |
| 2009/0219912 A1 | 9/2009 | Wengerter et al. |
| 2009/0295485 A1 | 12/2009 | Mitchell |
| 2009/0296663 A1 | 12/2009 | Wild |
| 2010/0085236 A1* | 4/2010 | Franceschini ......... G01S 13/765 342/30 |
| 2010/0172299 A1 | 7/2010 | Fischer et al. |
| 2010/0224732 A1 | 9/2010 | Olson et al. |
| 2010/0273504 A1 | 10/2010 | Bull et al. |
| 2010/0284377 A1 | 11/2010 | Wei et al. |
| 2010/0290412 A1 | 11/2010 | Ahn et al. |
| 2011/0032149 A1 | 2/2011 | Leabman |
| 2011/0103293 A1 | 5/2011 | Gale et al. |
| 2011/0122024 A1 | 5/2011 | Eidloth et al. |
| 2011/0142150 A1 | 6/2011 | Anigstein et al. |
| 2011/0182230 A1 | 7/2011 | Ohm et al. |
| 2011/0286325 A1 | 11/2011 | Jalali et al. |
| 2011/0286372 A1 | 11/2011 | Taghavi et al. |
| 2012/0052828 A1 | 3/2012 | Kamel et al. |
| 2012/0119953 A1 | 5/2012 | Hosoya et al. |
| 2012/0150364 A1 | 6/2012 | Tillotson et al. |
| 2012/0202430 A1 | 8/2012 | Jalali et al. |
| 2012/0235863 A1 | 9/2012 | Erdos et al. |
| 2013/0040655 A1 | 2/2013 | Keidar |
| 2013/0070677 A1 | 3/2013 | Chang |
| 2013/0109299 A1 | 5/2013 | Roos et al. |
| 2013/0148570 A1 | 6/2013 | Miller et al. |
| 2013/0155847 A1 | 6/2013 | Li et al. |
| 2013/0156021 A1 | 6/2013 | Ashikhmin et al. |
| 2013/0303080 A1 | 11/2013 | Moreno |
| 2013/0321204 A1* | 12/2013 | Zahavi ................ H01Q 3/08 342/368 |
| 2013/0331026 A1 | 12/2013 | O'Neill et al. |
| 2014/0003302 A1 | 1/2014 | Han et al. |
| 2014/0003394 A1 | 1/2014 | Rubin et al. |
| 2014/0049643 A1 | 2/2014 | Segerstrom et al. |
| 2014/0073337 A1 | 3/2014 | Hong et al. |
| 2014/0105054 A1 | 4/2014 | Sägrov et al. |
| 2014/0139372 A1 | 5/2014 | Seol et al. |
| 2014/0241239 A1 | 8/2014 | Chang |
| 2014/0335817 A1 | 11/2014 | Hyde et al. |
| 2014/0347223 A1 | 11/2014 | Hyde et al. |
| 2014/0348140 A1 | 11/2014 | Atkinson |
| 2015/0142966 A1 | 5/2015 | Baran et al. |
| 2015/0236778 A1* | 8/2015 | Jalali .................... H04W 84/06 370/316 |
| 2015/0236779 A1 | 8/2015 | Jalali |
| 2015/0236780 A1 | 8/2015 | Jalali |
| 2015/0236781 A1 | 8/2015 | Jalali |
| 2015/0237569 A1 | 8/2015 | Jalali |
| 2015/0280812 A1 | 10/2015 | Jalali |
| 2015/0301529 A1 | 10/2015 | Pillai et al. |
| 2015/0304885 A1 | 10/2015 | Jalali et al. |
| 2015/0362917 A1 | 12/2015 | Wang et al. |
| 2016/0013858 A1 | 1/2016 | Jalali et al. |
| 2016/0088498 A1* | 3/2016 | Sharawi ................ G01R 29/10 370/241 |
| 2016/0112116 A1 | 4/2016 | Jalali et al. |

(56) References Cited

U.S. PATENT DOCUMENTS

2016/0134358 A1     5/2016    Jalali et al.
2016/0337027 A1    11/2016    Jalali
2017/0156097 A1     6/2017    Weber et al.

FOREIGN PATENT DOCUMENTS

EP           2801838 A1    11/2014
JP           S6141979 A     2/1986
WO    WO-2014007873 A2    1/2014

OTHER PUBLICATIONS

Goldsmith AJ., et al., "Design Challenges for Energy-Constrained Ad Hoc Wireless Networks," Wireless Communications, IEEE, 2002, vol. 9 (4), pp. 8-27.

* cited by examiner

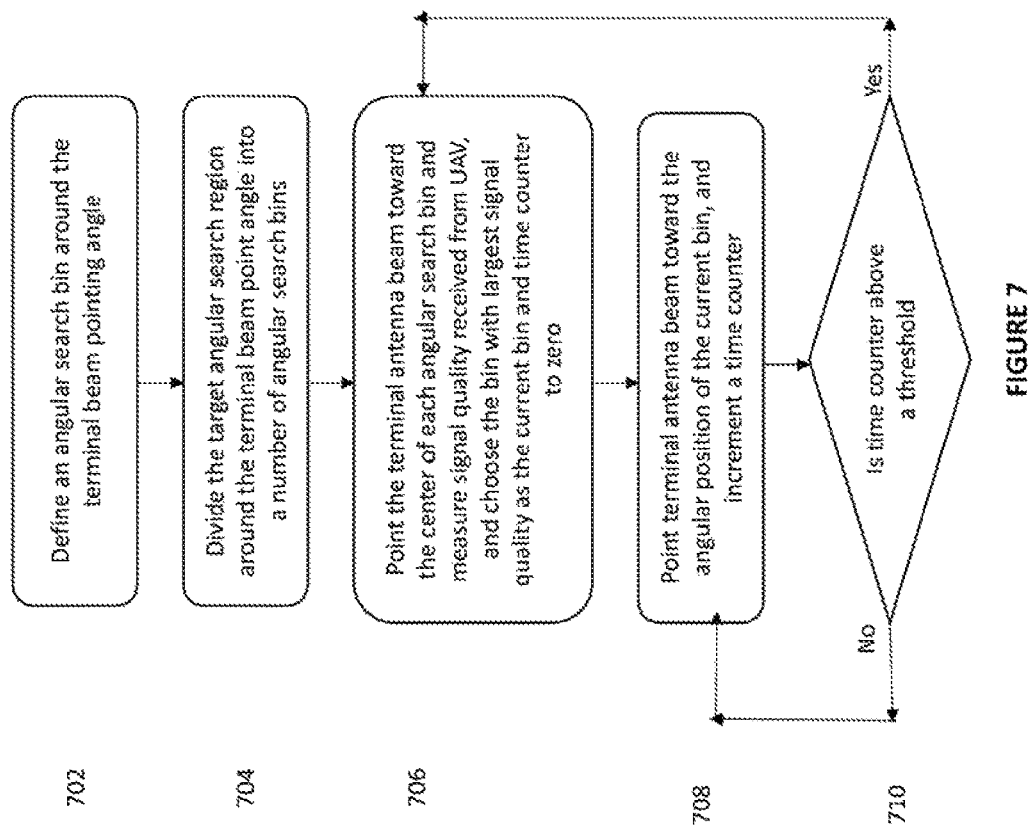

GROUND TERMINAL AND UAV BEAM POINTING IN AN UNMANNED AERIAL VEHICLE (UAV) FOR NETWORK ACCESS

PRIORITY AND RELATED APPLICATIONS

This application is a continuation of and claims the benefit of priority to, co-owned and co-pending U.S. patent application Ser. No. 15/260,049 of the same title filed on Sep. 8, 2016, which is a continuation-in-part of, and claims the benefit of priority to, co-owned U.S. patent application Ser. No. 14/711,427, entitled "GROUND TERMINAL AND GATEWAY BEAM POINTING TOWARD AN UNMANNED AERIAL VEHICLE (UAV) FOR NETWORK ACCESS", filed on May 13, 2015, now U.S. Pat. No. 9,590,720, each of the foregoing incorporated herein by reference in its entirety.

This application is related to co-owned, co-pending U.S. patent application Ser. No. 14/626,698, entitled "BEAM FORMING AND POINTING IN A NETWORK OF UNMANNED AERIAL VEHICLES (UAVS) FOR BROADBAND ACCESS", filed on Feb. 19, 2015, co-owned, co-pending U.S. patent application Ser. No. 14/516,491, entitled "UNMANNED AERIAL VEHICLE (UAV) BEAM FORMING AND POINTING TOWARD GROUND COVERAGE AREA CELLS FOR BROADBAND ACCESS", filed on Oct. 16, 2014, co-owned, co-pending U.S. patent application Ser. No. 14/486,916, entitled "ANTENNA BEAM MANAGEMENT AND GATEWAY DESIGN FOR BROADBAND ACCESS USING UNMANNED AERIAL VEHICLE (UAV) PLATFORMS", filed on Sep. 15, 2014, co-owned, co-pending U.S. patent application Ser. No. 14/295,160, entitled "METHODS AND APPARATUS FOR MITIGATING FADING IN A BROADBAND ACCESS SYSTEM USING DRONE/UAV PLATFORMS", filed on Jun. 3, 2014, co-owned, co-pending U.S. patent application Ser. No. 14/222,497, entitled "BROADBAND ACCESS TO MOBILE PLATFORMS USING DRONE/UAV", filed on Mar. 21, 2014, and co-owned, co-pending U.S. patent application Ser. No. 14/223,705, entitled "BROADBAND ACCESS SYSTEM VIA DRONE/UAV", filed on Mar. 24, 2014, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure describes aspects of a system for broadband internet access using unmanned aerial vehicles (UAVs) to relay internet traffic among different types of terminals. The present disclosure describes systems and methods for optimally pointing the beams of a UAV toward the coverage area on the ground (including ground terminals) as well as pointing the ground terminal beam toward the UAV, and adjusting the ground terminal and UAV beams based on the UAV's altitude, movements, and motions (such as rolling and/or pitching).

2. Description of Related Technology

As internet traffic has increased, new technologies are needed to deliver broadband access to homes and enterprises at Sower cost and to places that are not yet covered. Examples of current broadband delivery systems include terrestrial wired networks such as DSL (Digital Subscriber Line) on twisted pair, fiber delivery systems such as FiOS (Fiber Optic Service), and gee-stationary satellite systems. The current broadband, access systems have a number of short comings. One issue is that there is a lack of service provided to remote and/or lightly populated areas. Geo-stationary satellites do provide service in remote areas of the developed world such as the United States. However, poorer areas of the world lack adequate satellite capacity.

A notable reason satellite capacity has not teen adequately provided in poorer regions of the world is the relatively high cost of satellite systems. Due to adverse atmospheric effects in satellite orbits, satellite hardware must be space qualified and is costly. Launch vehicles to put the satellites in orbit are also costly. Moreover, due to the launch risk and the high cost of satellites, there may be significant insurance costs for the satellite and the launch. Therefore, broadband satellite systems and services are relatively costly and difficult to justify, particularly in poorer regions of the world. It is also costly to deploy terrestrial systems such as fiber or microwave links in lightly populated regions. The small density of subscribers does not justify the deployment cost.

Hence what are needed are improved methods and apparatus for providing broadband access to consumers. Ideally such methods and apparatus would rely on an inexpensive technology which avoids costs associated with launching and maintaining satellites.

SUMMARY

The present disclosure describes, inter alia, systems and methods for optimally pointing the beams of the ground terminal and ground gateways toward the UAV, and adjusting the ground terminal and gateway beams toward the UAV based on the UAV's altitude, movements, and motions (such as roll/pitch). The disclosure also describes systems and methods for pointing the UAV antenna beam toward ground terminals.

A communications system for operating an unmanned aerial vehicle (UAV) apparatus is disclosed. In one embodiment, the UAV apparatus is configured to generate and steer one or more UAV beams toward a ground location; and aground terminal is configured to generate and steer one or more ground terminal beams. In one exemplary embodiment, the ground terminal apparatus further includes logic configured to: receive real-time position coordinates associated with the UAV apparatus; define a current bin and a plurality of search bins based on the real-time position coordinates; measure at least one signal quality corresponding to at least one bin of the plurality of search, bins and a current signal quality of the current bin; and when the at least one signal quality is higher than the current signal quality, redefine the at least one bin as the current bin.

In one variant, the ground terminal apparatus further includes logic configured to measure at least one signal quality is configured to measure a signal quality for each one of the plurality of search bins.

In another variant, the ground terminal apparatus further includes one or more encoder devices configured to track an actual antenna beam pointing position of the steered one or more ground terminal beams. In a sub-variant, the one or more encoder devices include logic configured to: compute an expected terminal antenna pointing position based on an accumulated plurality of motor movement commands; compute an error between the actual antenna beam pointing position and the expected terminal antenna pointing position; and adjust the steered one or more-ground terminal beams to correct for the error.

In another variant, the received real-time position coordinates are received via a communications radio link with the UAV apparatus when the communications radio link is present. In some sub-variants, the received real-time position coordinates are received via an out-of-band telemetry tracking radio link when the communications radio link is not present. In other sub-variants, the ground terminal apparatus further includes logic configured to receive a speed and a direction associated with the UAV apparatus via the communications radio link; estimate an position coordinate of the UAV apparatus based, on the speed, the direction, and the real-time position coordinates of the UAV apparatus; and adjust the steered one or more ground terminal beams to the estimated position coordinate.

In some variants, the measured current signal quality includes a received signal strength (RSS) associated with a reference signal of the UAV apparatus.

A communications system for operating an unmanned aerial, vehicle (UAV) apparatus is disclosed. In one embodiment, the communications system includes: a UAV apparatus configured to generate and steer one or more UAV beams toward a ground location; a ground terminal configured to generate and steer one or more ground terminal beams. In one exemplary embodiment, the UAV apparatus further includes; an on-board positioning and orientation sub-system configured to determine real-time position, coordinates and an orientation of the UAV apparatus; logic configured to acquire position coordinates of the ground terminal; and wherein the one or more UAV beams are steered toward the position coordinates of the ground terminal based on the determined real-time position coordinates and the orientation of the UAV apparatus.

In one variant, the UAV apparatus further includes logic configured to: divide a target area into a plurality of search bins; measure a plurality of signal quality metrics for each one of the plurality of search bins, the plurality of signal quality metrics associated with at least one ground terminal; and steer the one or more UAV beams to a bin having a highest signal quality metric associated with the at least one ground terminal.

In another variant, the UAV apparatus further includes one or more encoder devices configured to track an actual antenna beam pointing position of the steered one or more UAV beams. In some sub-variants, the UAV apparatus is further configured to: compute an expected UAV antenna pointing position based on an accumulated plurality of motor movement commands; compute an error between the actual antenna beam pointing position and the expected UAV antenna pointing position; and adjust the steered one or more UAV beams to correct for the error.

A method for operating an unmanned aerial vehicle (UAV) apparatus is disclosed. In one embodiment, the method includes: generating one or more terminal antenna beams; receiving real-time position coordinates associated, with the UAV apparatus; pointing the terminal antenna beam toward the UAV position; and continuously monitoring a signal qualify by: defining a plurality of search bins around a current position; measuring the signal quality for each of the plurality of search bins; and when the measured signal quality of a searched bin exceeds a current signal quality of the current position, set the searched bin to the current bin.

In one variant the method includes receiving the real-time position coordinates associated with the UAV apparatus via an out-of-band communication.

In a second variant, the method further includes receiving the real-time position coordinates associated with the UAV apparatus via a broadcast communication.

In a third variant, when the current signal quality of the current position fails below an acceptable threshold, the method further includes searching for another UAV apparatus.

A method of detecting a ground terminal with an unmanned aerial vehicle (UAV) apparatus is disclosed, in one embodiment, the method includes: determining a location and orientation of the UA V apparatus; identifying a coarse location bin of the ground terminal, the identifying including: pointing a UAV antenna toward an estimated location of the ground terminal based on the determined location and orientation of the UAV apparatus; defining a first plurality of search bins proximate to the estimated location; continuously measuring a signal quality metric at each of the first plurality of search bins; and thereafter continuously fine tracking the ground terminal by tracking the particular bin of the first plurality of search bins having the highest measured signal quality metric.

In one variant, the method further includes adjusting the pointed UAV antenna based on the continuously determined location and orientation of the UAV apparatus.

In a second variant, the measurement of the signal quality metric includes measuring a received signal strength (RSS) associated with a reference signal of the ground terminal.

In a third variant, the method further includes determining a number of bins for the first plurality of search, bins based at least in part on an operational consideration of the UAV apparatus.

A method for fine tracking of UAV position is also disclosed. In one embodiment the method includes pointing a terminal antenna beam toward the position coordinate of a UAV; defining the terminal antenna beam pointing position as the center of the current bin; pointing the terminal antenna beam to the center of each search bin surrounding the current bin; and continue a fine tracking process unless/until the RSS signal is lost.

A method for initial "coarse" ground terminal detection and subsequent "fine" UAV beam steering toward the ground terminal is also disclosed. In one embodiment, the method includes pointing an UAV antenna toward position coordinates of a ground terminal; setting UAV antenna beam pointing position to a center of a current bin; monitoring search bins for higher level signal levels; and when a bin with a stronger RSS than the current bin is found, setting the identified bin as the new current bin.

These and other aspects shall become apparent when considered in light of the disclosure provided herein.

BRIEF DESCRIPTION OF THE DRAWINGS

In the following figures, where appropriate, similar components are identified using the same reference label.

FIG. 7 is aa exemplary flow chart of the fine UAV tracking procedure used by ground terminals to accurately position the terminal's antenna beam toward the UAV and to track the UAV movements.

All Figures® Copyright 2015-2016 Ubiqomm, LLC. All rights reserved.

DETAILED DESCRIPTION

The present disclosure describes aspects of a system designed to provide broadband access.

As used herein, the aerial platforms to which the embodiments of the present disclosure refer generally and without limitation to: drones, unmanned aerial vehicle (UAV), balloons, blimps, airships, etc. The aerial platforms may include propulsion systems, fuel systems, and onboard navigational and control systems. In one exemplary embodiment, the aerial platform includes a fixed wing fuselage in combination with a propeller, etc. In other embodiments, the aerial platform includes a robocopter, propelled by a rotor. The aerial platform may carry fuel onboard or function using electrical (e.g., battery powered) and/or solar energy. In the remainder of the present disclosure, the terms "aerial platform" and "UAV" refer to any of the abovementioned platforms such as drones, balloons, blimps, airships, etc. Conversely, reference to UAVs, drones, balloons, blimps, airships, etc, in the present disclosure can refer to aerial platforms in general or any other type of aerial platforms.

Figure 1:
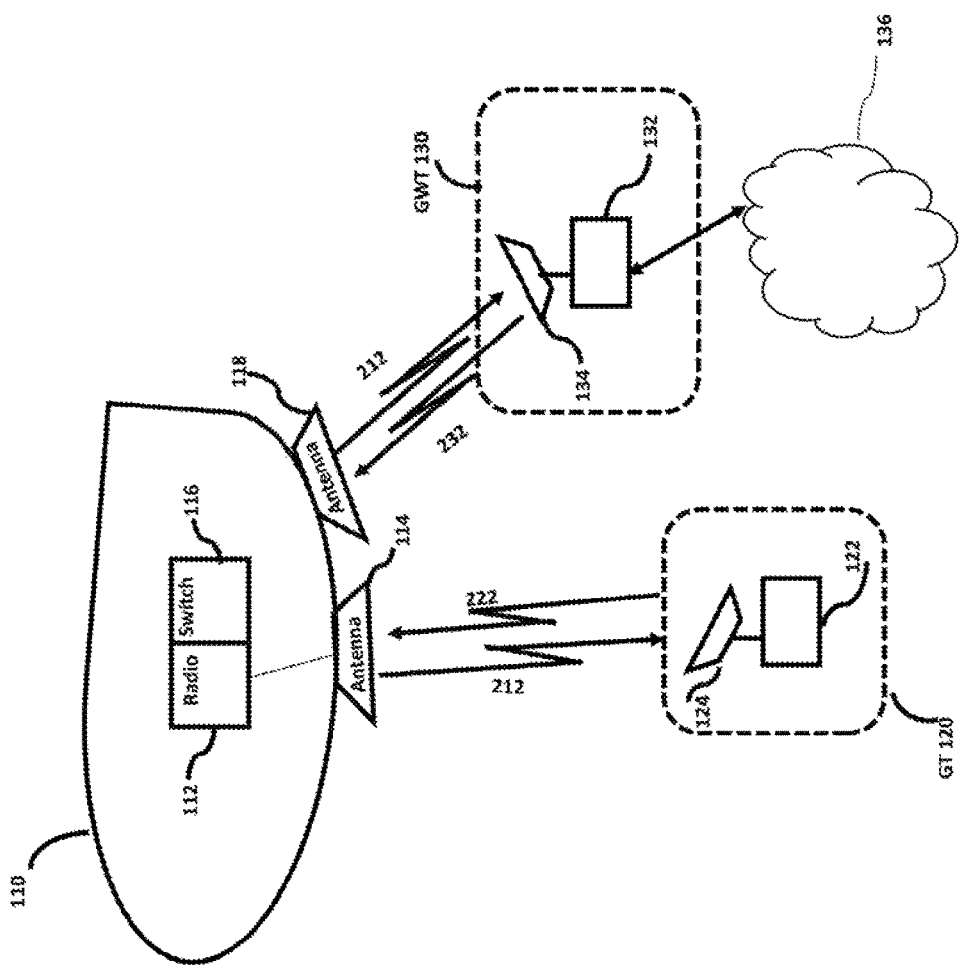
FIG. 1 is a graphical depiction of an exemplary aerial platform based communications system useful in conjunction with various embodiments described herein.

FIG. 1 shows one exemplary embodiment of an unmanned aerial vehicle (UAV) 110. UAVs communicate with at least two kinds of ground terminals: one type is the user Ground Terminal (GT) 120, such as terminals at home or enterprises to provide network connectivity to home or enterprise (e.g., over the internet); a second type is referred to as the Internet Gateway (GTW) 130 which is connected to the Internet, e.g., GT 136. Note that embodiments, described below apply to fixed terminals and devices on the ground, mobile terminals and devices attached to platforms such as vehicles, boats, ship, airplanes, trucks, etc., and standalone mobile devices (e.g., handheld devices, etc,). The term "device" as used hereinafter may broadly encompass any of the aforementioned platforms (e.g., the drone or UAV 110, the err 120, and/or the GTW 130). As shown, the exemplary UAV 110 has a drone radio sub-system 112 a message switch sub-system 116 and at least one drone antenna aperture sub-system 114 to provide coverage to the ground terminals 120, and at least one drone antenna 118 to provide coverage to the gateway terminals 130. During operation, the UAV is configured to cruise or patrol an "orbit", and provide connectivity between the GT 120, other ground terminals and/or GTW terminals 130. The GTWs 130 may be connected to broader Internet networks 136 via a gateway radio sub-system 132 and signals 212 and/or 232, thereby allowing the GT 120 Internet access and/or access to other GT or GTW.

Figure 2B:
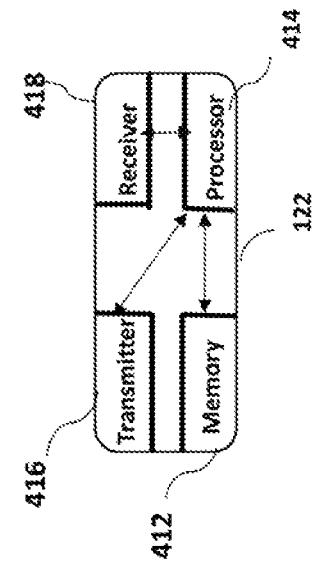
FIG. 2B is a graphical depiction of exemplary radio equipment of a ground terminal useful in conjunction with various embodiments described herein.
Figure 2A:
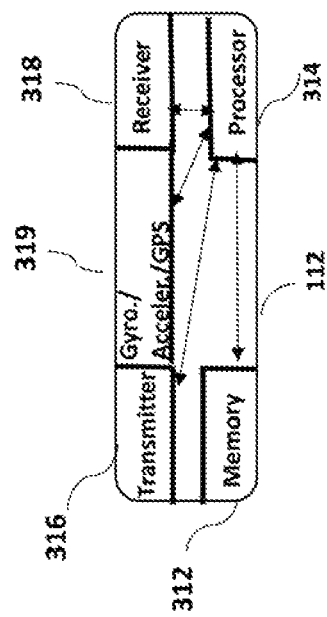
FIG. 2A is a graphical depiction of exemplary radio equipment of an aerial platform useful in conjunction with various embodiments described herein.

FIG. 2A illustrates one exemplary embodiment of an unmanned aerial vehicle (UAV) radio sub-system 112 that includes five (5) sub-systems; (i) a receiver 318 that is configured to demodulate and decode a signal received from a drone antenna aperture sub-system 114; a transmitter 316 that is configured to modulate data received from a processor 314 and send the resulting signal through the drone antenna aperture sub-system 114; a processor sub-system 314 that is configured to carry out functions such as: (i) configuring the receiver 318 and transmitter 316 sub-systems, (ii) processing the data received from the receiver 318 sub-system, (iii) determining the data to be transmitted through the transmitter sub-system 316, and (iv) controlling the antenna sub-system 114; a non-transitory computer readable memory sub-system 312 that is configured to store one or more program code instructions, data, and/or configurations, and system parameter information that are accessed by the processor 314; and (v) a gyroscope/accelerometer/global positioning system (GPS) sub-system 319 that is configured to determine a position and orientation of the UAV such as yaw, roll and/or pitch angles.

Depending on the altitude of the UAV, each UAV covers an area on the ground; in one embodiment the area covered has a radius of as low as a few tens of kilometers (km) to as much as 200 km or more. GTs 120 transmit and receive data from the Internet using the UAV 110 as intermediary to the GTW 130, The UAV's radio sub-system aggregates traffic received from the GTs within the coverage area of the UAV of a population of GTs (in some-implementations the UAV may aggregate traffic from as many as all GTs and as few as one GT) and sends the aggregated data to the internet via one or more of the GTWs. Since the GTWs handle aggregated data from multiple GTs, practical implementations of the present disclosure may support higher data rates between the UAV and the GTW, than between the UAV and the GT. Accordingly, in one embodiment the gain of the GTW antenna sub-system is much larger than that of the GT, and the GTW transmitter transmits at higher power than the GTs. Those of ordinary skill in the related arts will readily appreciate the wide variety of techniques which may be used to increase gain, including without limitation, increasing transmit and receive power, increasing bandwidth, increasing processing gain, increasing coding gain, etc.

Referring back to the embodiment of FIG. 1, the GT 120 has two main sub-systems: a ground terminal radio subsystem 122, and a ground terminal antenna sub-system 124. As shown in FIG. 2B, the GT radio sub-system 122 includes 4 sub-systems; (ii) the receiver 418 that demodulates and decodes the signal from the drone antenna sub-system; (ii) the transmitter sub-system 416 that modulates the data and sends the resulting signal 222 through the antenna subsystem 124; (iii) the processor sub-system 414 that carries out functions such as: configuring the receiver 418 and transmitter 416 sub-systems, processing the data received from the receiver 418 sub-system, determining the data to be transmitted through the transmitter sub-system 416, as well as controlling the antenna sub-system 124; and (iv) the memory sub-system 412 that contains program code, configuration data, and system parameters information that are accessed by the processor 414.

Figure 3:
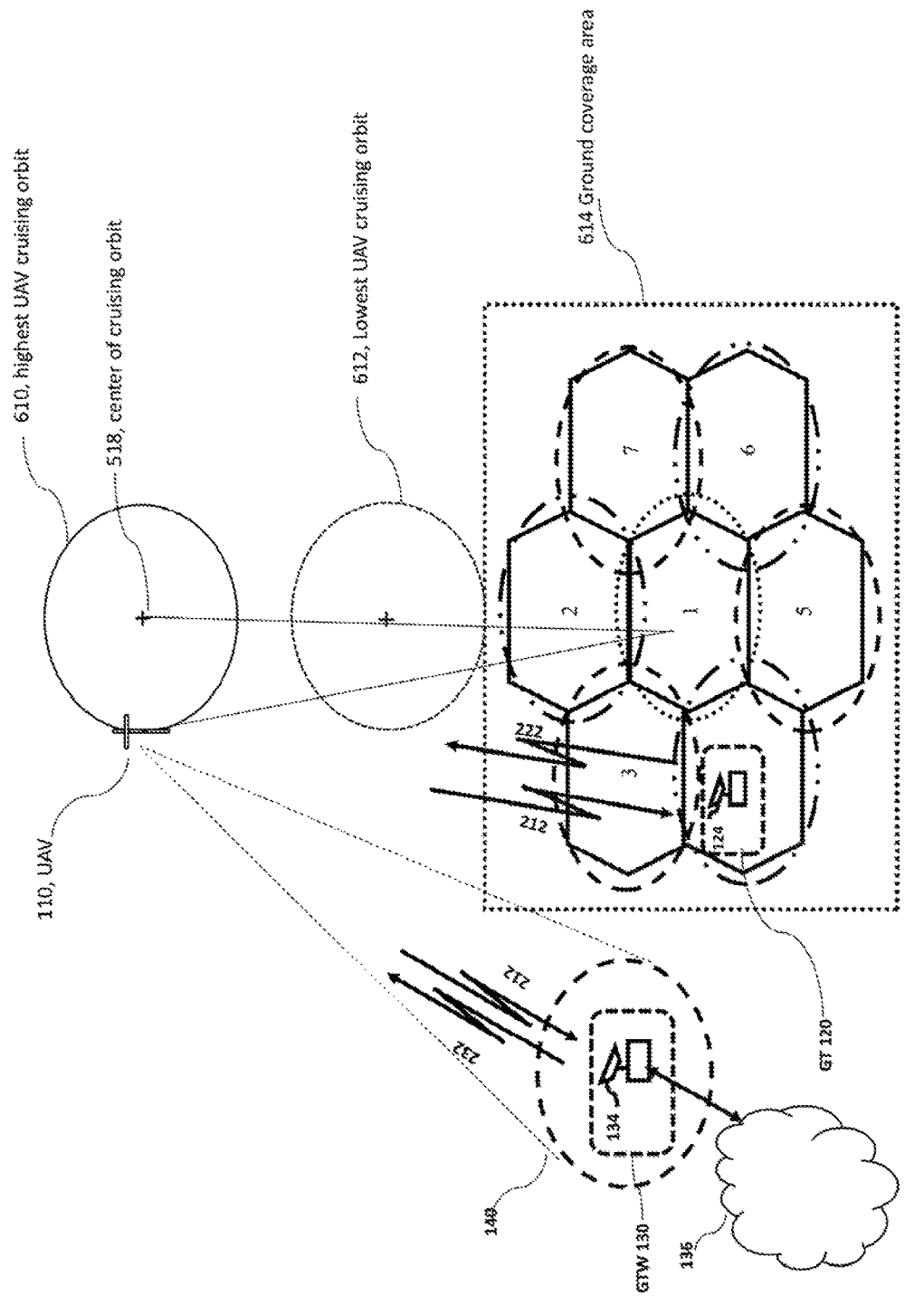
FIG. 3 is a graphical depiction of an exemplary cruising area, of the aerial platform/UAV and the related coverage areas on the ground.

Referring now to FIG. 3, the desired target coverage area 614 where terminals 120 are served on the ground is divided into a number of cells; one such exemplary division is shown as an arrangement of seven (7) hexagonal cells. The aerial platform forms beams to cover each cell on the ground in its target coverage area. As shown, the UAV generates seven (7) beams corresponding respectively to the hexagonal cells; e.g., one (1) "central beam" and one (1) ring of beams around the central beam, on the ground. The hexagonal areas represent the ideal coverage area of each beam. In reality, the beams overlap as shown by the different types of dashed circles (i.e., dot, dash, and dot-dash). In this exemplary diagram, the available frequency bandwidth is divided into three (3) bands (F1, F2 and F3), which are assigned to each beam in such a way that no two neighboring beams use the same frequency, the three (3) different dotted circle types indicate beams that use different frequency bands. The foregoing frequency allocation scheme is described as having a "frequency reuse" of three (3). Those of ordinary skill in the related arts, given the contents of the present disclosure, will readily appreciate that other frequency reuse schemes and/or cell divisions may be interchangeably used with equal success.

In addition, FIG. 3 shows one central beam and one ring of beams surrounding the central beam. Additional rings of beams may be added around existing ring(s) to increase the total number of beams. For example, adding a second ring of beams consisting of 12 beams would increase the total number of beams to 19 (7 existing+12 from the second ring). Similarly, adding a third ring of beams consisting of 18 beams around the second ring would increase the total number of beams to 37.

Aerial platforms such as UAVs cruise/patrol in a three dimensional space (e.g., latitude, longitude, and altitude). The position of the aerial platform/UAV with respect to the terminals on the ground changes as the aerial platform/UAV moves horizontally and vertically within its cruising orbit.

FIG. 3 further illustrates an exemplary cruising area of the aerial platform. The tap solid circle 610 shows the cruising orbit of the aerial platform/UAV when the platform is at its highest possible altitude. The lower dotted circle 612 shows the cruising orbit when the platform is at Its lowest cruising altitude. During normal operation, the aerial platform cruises within an orbit at a particular altitude, e.g., as shown by circles 610 or 612 which are centered around a point 518. Over time, however, the aerial platform may move vertically up or down depending on time of day. For instance, solar powered drones may need to run on battery power at night. To conserve energy, the drone may reduce its altitude, e.g., from one altitude to an altitude corresponding to lower circle 612.

Two types of terminals are further illustrated in FIG. 3. GT 120, installed at homes or enterprises (or other stations such as vehicles as noted supra), and referred to as ground terminals, send and receive data from the Internet 136 (or other wirelessly accessible network) via UAV 110. Only one of the terminals 120 is shown in the figure for purposes of clarity. UAV 110 in turn connects to the Internet 136 via gateway GTW 130. Ground terminals 120 are located within the coverage area provided by beams 1 through 7. Beams 1 through 7 provide coverage to terminals 120 and are referred to as the GT beams. Since the gateway 130 may be located farther from the UAV than the ground terminals are, the gateway 130 may be outside of the coverage area of the GT beams 1 through 7. Therefore, the physical arrangement of gateway 130 and terminals 120 as shown in FIG. 3 requires a separate beam 140 formed by UAV 110 and pointed toward the location of gateway 130. An advantage of the arrangement as shown is that the terminals 120 may be farther apart than the conventional distance used by, for example, the infrastructure of existing Internet service providers. Moreover, gateway 130 and ground terminals 120 being physically disconnected may contribute to reducing the cost of providing connectivity to consumers, as is an objective of the present disclosure.

In one embodiment, the GT beams are static in the sense that as the UAV moves in its cruising orbit formed by a cylinder between circular orbits 610 and 612 in FIG. 3, the GT beams move on the ground, following the movement of the UAV. In other words, the UAV GT beam antenna sub-system may not adjust the GT beams to stay fixed on specific locations on the ground. As a first GT beam moves over a terminal 120 and a second GT beam starts to cover terminal 120, terminal 120 is handed over from the first GT beam to the second GT beam.

In the case of beam 140, referred to as the UAV Gateway beam, the UAV radio sub-systems points the UAV Gateway beam 140 to the gateway 130 using knowledge of position coordinates of the gateway 130 as well as real-time position coordinates and orientation of the UAV. In one embodiment, the real-time position coordinates and orientation of the UAV are computed by the gyroscope accelerometer GPS sub-system 310 of the UAV radio sub-system 112 shown in FIG. 2A. Therefore, as the UAV moves in its cruising orbit, the UAV real-time position coordinates and orientation angles are used to continuously repoint the UAV Gateway beam 140 toward gateway 130. That is, the UAV gateway antenna sub-system 118 adjusts the UAV Gateway beam 140 to stay relatively fixed on specific locations on the ground, in this case the gateway 130.

In one embodiment of the present disclosure, the UAV gateway antenna sub-system 118 shown in FIG. 1 illustrates a two axis mechanical antenna, beam steering capability; the UAV radio sub-system 112 instructs the UAV gateway antenna sub-system 118 to adjust its antenna beam pointing angle on two axes using information on real-time position coordinates and orientation angle of UAV 110. In another embodiment of the present disclosure, the UAV gateway antenna 118 includes at least one axis mechanical beam steering capability and at least one axis electronic beam forming capability, used in steering the UAV gateway antenna beam toward gateway 130.

Next, systems and methods are described for pointing the ground terminal 120 antenna 124 beam and ground gateway antenna 134 beam toward, the UAV at the initial ground terminal, and ground gateway installation, as well as continuous optimal steering of the ground terminal and gateway antennas toward the UAV to track the UAV movements. Since the processes of pointing the ground antennas toward the UAV at initial installation and continuous optimal steering of the antennas toward, the UAV are the same for the ground terminals 120 and ground gateways 130, both types of terminals simplify may be referred to as a "terminal." In particular, the embodiments described below apply to both ground terminals 120 and ground gateways 130.

Since terminal 120 antenna beam may have a narrow beamwidth, as the UAV moves in its cruising orbit the terminal's antenna beam may not cover the UAV unless the terminal's antenna beam is either mechanically or electronically steered to track the position of the UAV. In particular, when the terminal is initially installed, the terminal's antenna must be pointed toward the UAV in such a way that the terminal's beam covers the UAV. One embodiment of the present disclosure describes systems and methods to point the terminal antenna beam toward the UAV at the time of terminal installation. One approach to pointing the terminal antenna is to use information on the position (e.g., coordinates) or location (e.g., relative or absolute) of the UAV. If the real-time position coordinates of the terminal and the UAV are known, then an installer may manually point the antenna toward the UAV.

In another embodiment schemes fully or at least partially automate the process of pointing the terminal beam toward the UAV at terminal installation time. One variant assumes that real-time position coordinates of the UAV are known to the installer at installation time. Referring again to FIG. 3, initially the UAV terminal antenna 124 is manually pointed in the general direction of the UAV 110 based on information on the approximate UAV position or location. The real-time UAV position coordinates are entered into the terminal's antenna sub-system to improve accuracy, in one variant. The terminal antenna, sub-system uses the real-time UAV position coordinates to point the terminal antenna toward the UAV. Following the pointing of the terminal antenna beam toward the UAV at initial installation, the terminal antenna sub-system tracks UAV position, once the terminal antenna beam beamwidth is narrower than the UAV musing orbit. Once the terminal 120 and UAV 110 establish a connection, the UAV 110 may periodically send its real-time position coordinates to the terminal 120. The terminal antenna sub-system 124 uses the updated UAV position coordinates to adjust the terminal's antenna beam toward the UAV.

In another embodiment of the initial calibration to point the terminal antenna beam toward the UAV, the terminal does not have access to accurate information regarding the real-time position or location of the UAV at the time of terminal installation. Once the UAV terminal antenna is pointed in the general direction of the UAV, then the terminal antenna sub-system follows the two phases of (1) UAV signal detection and (2) UAV position tracking to accurately point the terminal antenna beam toward the UAV, During the UAV detection phase, the terminal antenna beam is iteratively steered toward the UAV in relatively large incremental azimuthal and/or elevation angles in order to detect a reference signal sent by the UAV. As a brief aside, those of ordinary skill in the related arts will readily appreciate that the ground terminal (and/or the UAV) is not perfectly aligned for reception where the antennas are only proximately aligned (e.g., to within a few degrees of accuracy, etc.); for example, alignment may be performed to a tolerable percentage of reception strength, etc. Thereafter, the ground terminal (and/or UAV) must further fine tune the alignment to maximize reception strength. Consequently, once the terminal detects a reference signal sent by the UAV, then the terminal antenna sub-system moves to the fine UAV position tracking phase where the terminals antenna beam is iteratively steered in smaller incremental azimuthal and/or elevation angles toward the UAV to find the terminal antenna beam position toward the UAV with highest performance signal quality measure such as the received signal strength (RSS). The coarse UAV detection phase and the fine UAV position tracking phase are described in further detail herein.

In one exemplary embodiment, the ground terminal includes a two axis mechanical antenna beam steering mechanism. In one such variant, the two axis are configured for manipulating the azimuthal and/or elevation angle of the boresight. In another embodiment of the present disclosure, the ground terminal includes at least one axis of mechanical beam, steering capability and at least one axis of electronic beam forming capability, for use in steering the antenna beam toward the UAV.

UAV Detection and Coarse Tracking Using Signals Received from the UAV

Figure 4:
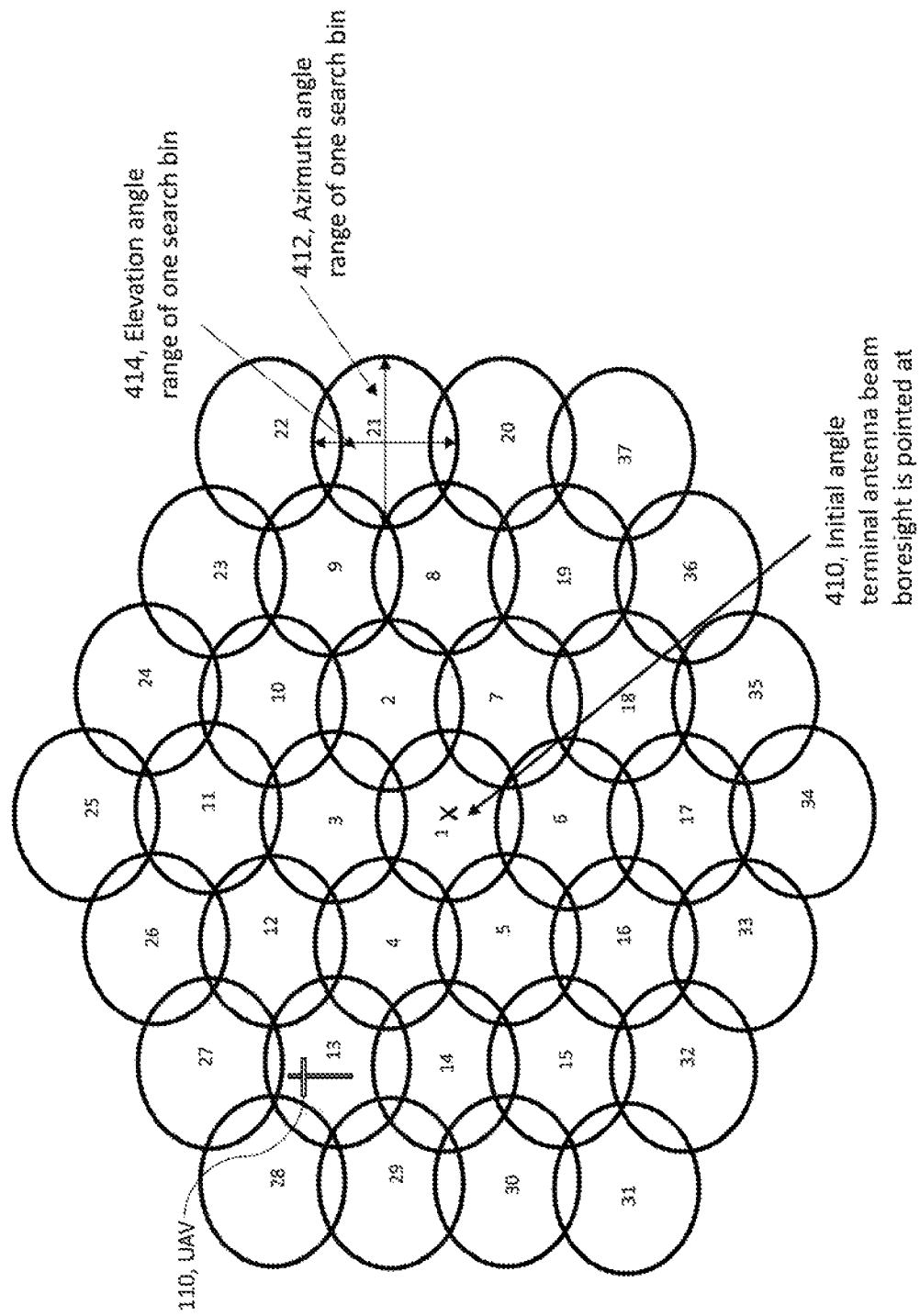
FIG. 4 is a diagram of UAV position and terminal antenna beam angular search bins during a coarse UAV detection by ground terminal.

In one exemplary embodiment of the present disclosure, the ground terminal performs UAV detection and so-called "coarse" tracking phase of the UAV using signals received from the UAV. Referring now to FIG. 4, during the coarse UAV detection phase, the two-dimensional azimuthal and/or elevation terminal antenna beam angle search space is divided into a discrete number of beam pointing angular bins, each with its own azimuthal and elevation angle ranges 412, 414. For purposes of clarity, hexagonal cell boundaries as previously shown in FIG. 3 are not shown in the coverage area of FIG. 4. FIG. 4 shows the position of the UAV 110 as well as the angular position 410 at which the terminal beam boresight is pointing after the initial terminal antenna general beam pointing procedure described above. Since, during the UAV detection phase, the objective is for the terminal radio sub-system to be able to detect the reference signal from the UAV, and not necessarily send data at high rates, the terminal receiver can tolerate a loss of as much as 10 dB of antenna gain due to inaccurate (coarse) antenna pointing yet still detect the reference signal from the UAV. Therefore, the angular search bin may be as large as that of the 10 dB beamwidth of the terminal antenna beam in the azimuth and elevation angles. Note that the 10 dB beamwidth of the antenna beam is defined as the azimuth or elevation angle width from the beam's boresight where the antenna gain is within 10 dB of the peak gain.

Next is an example of how the number of terminal antenna beam angular search bins is determined during UAV detection phase. Suppose the 10 dB beamwidth of the terminal antenna beam is +/−10 degrees from the beam boresight. If as an example, the approximate knowledge of the UAV position is within 100 (+/−50) degrees of elevation angle and 100 degrees of azimuth angle from the UAV terminal's current beam pointing angle, then the 100 degree elevation and azimuth search space may be divided into at least 5 angular search bins of 20 degrees each, resulting in 5×5=25 two-dimensional "circular angular" search bins. However, since the search bins are circular angular bins, some overlapping between different search bins occurs.

FIG. 4 further illustrates an exemplary thirty-seven (37) angular search bins covering an angular region of 100 degrees in azimuth and 100 degrees in elevation according to the aforementioned example. As shown, the UAV 110 is in bin 13 relative to the angular bin at which the terminal antenna beam is initially pointed. The different angular search bins each correspond to the angular position where the antenna is initially pointed. In other words, the center of the angular search bin in the center of the search bin layout is the initial position of the antenna, in each terminal antenna angular search bin (e.g., bins 1 through 37 in FIG. 4), the terminal radio sub-system points the terminal beam toward the center of the bin and searches for a reference signal 212 (see FIG. 3) sent by UAV on the frequency channels used on the different GT beams (e.g., F1, F2 and F3 as described supra) until the reference signal is detected on one of the frequency channels. If alter a certain time period the reference signal is not detected in a given angular search bin, then the antenna is instructed to point its beam's boresight to the center of a different angular search bin, and the terminal antenna beam remains in the new position for a time period where the UAV terminal may detect the reference signal if the terminal antenna is pointing toward the UAV. This procedure of changing the terminal antenna beam pointing angle toward the center of the specified angular search bins continues until the reference signal seat by the UAV is detected.

In another embodiment of the ground terminal antenna, the initial coarse UAV detection may be achieved by directly using the UAV position coordinates for pointing. While such embodiments greatly reduce search times, they require that the ground terminal receives the UAV's position coordinates in order to locate the UAV. For example, in one such variant, the UAV position coordinates are received via a broadcasted radio link from the UAV, such as a so-called "TT&C" (Telemetry Tracking & Command) link, between the UAV and the ground terminal site. During the coarse UAV detection phase, the ground terminal receives the UAV position coordinates from the TT&C link and responsively points its ground terminal antenna toward the UAV. More generally, any messaging protocol may be used for providing one or more of telemetry information, tracking information, and/or commands between the UAV and the ground systems. For example, in other variants, the UAV position coordinates may be received via an out-of-hand communication link from an over-arching network management entity or other networked device. In another example, the UAV position coordinates may be provided by a peer ground terminal or another UAV terminal (such as where one UAV terminal is congested and must handoff ground terminals to a nearby UAV terminal).

Fine Tracking of UAV Position Coordinates with UAV Fine Beam Steering

Figure 5:
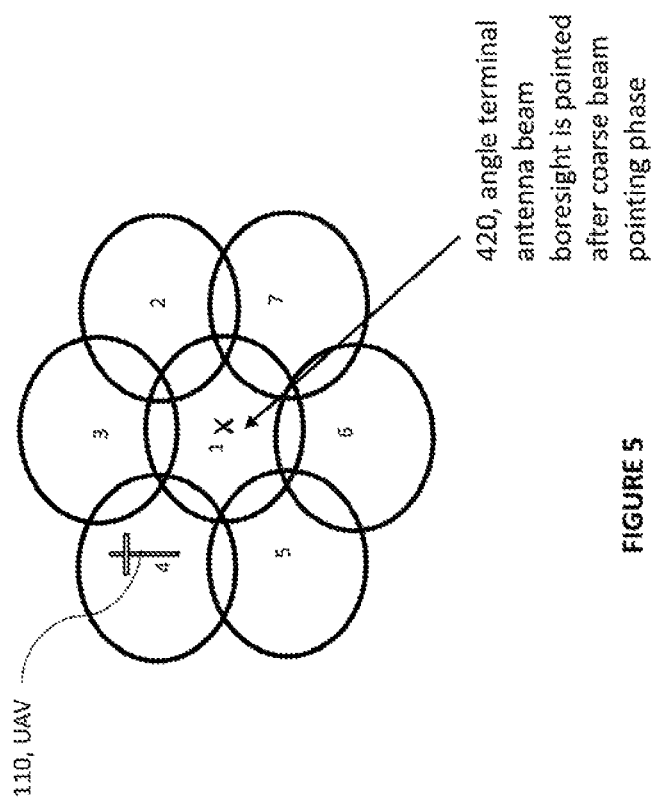
FIG. 5 is a diagram of UAV position and terminal antenna beam angular search bins during a fine UAV position tracking phase by ground terminal.

Once the ground terminal has identified a reference signal in the coarse UAV detection phase, then the terminal antenna beam pointing moves into a fine UAV position tracking phase (as shown in FIG. 5). During the line UAV position tracking phase, angular search bins (e.g., bins 2 through 7) are defined around the angular position 420 at which the terminal antenna beam is pointing at the conclusion of the UAV detection phase. The "current search bin" is defined around this angular position 420. Bin 1 in FIG. 5 is shown as the current search bin where the terminal antenna beam is pointing. The terminal beam elevation and azimuth angular search bin sizes during line UAV position tracking may be as low as only 2 degrees or less; more directly, during fine tracking a much tighter and more accurate bin structure is used. During the fine UAV position tracking phase, the terminal antenna beam points toward the center of the current, bin (bin 1), and measures the RSS (received signal strength) or various other well-known, signal quality metrics of the received signal from UAV.

Next, the terminal antenna beam is moved to the center of each of the surrounding bins 2 through 7 and the RSS (or an alternative signal quality metric) is measured in each of these bins, Each move is adjusted to compensate for change in GPS location of the UAV. In one embodiment, the bin with the highest RSS or signal quality from among the seven (7) bins is chosen as the next current angular bin and is marked as bin 1. Since the UAV and the ground terminal may move with respect to one another and channel conditions may constantly change, one or both of the UAV and ground terminal may constantly monitor the link quality to optimize performance. For example, if the UAVs movement results in a higher RSS or signal quality in a different bin from the previous bin position, then the new bin is chosen as the next angular bin and is marked as bin 1. Then, another six (6) bins are specified surrounding the new current bin. This process of measuring signal quality of the seven (7) search bins and choosing a bin with a higher or highest signal, quality as the position where the terminal antenna beam points, while also adjusting for each movement to compensate for GPS position changes of the UAV, may be used to continuously track the position of the UAV. The aforementioned search scheme based on seven (7) search bins is one exemplary illustration of the fine UAV position tracking phase. In other embodiments, fewer or greater number of bins may be defined and used in the fine UAV position tracking phase. Stated differently, during the fine UAV tracking phase, the terminal antenna beam is dithered around the terminal's initial angular pointing position (referred to as current angular bin above), wherein among the current bin and bins adjacent thereto, the bin having the highest received signal quality is chosen as the next current terminal angular search bin.

More generally, once the initial coarse UAV detection, is achieved (e.g., using the schemes described supra), then the fine beam steering scheme corrects for the changes to signal quality as the UAV travels in its cruising orbit. The fine UAV tracking phase corrects for, inter alia, the UAV position information, based on focused measurements of the RSS of the UAV.

Figure 5A:
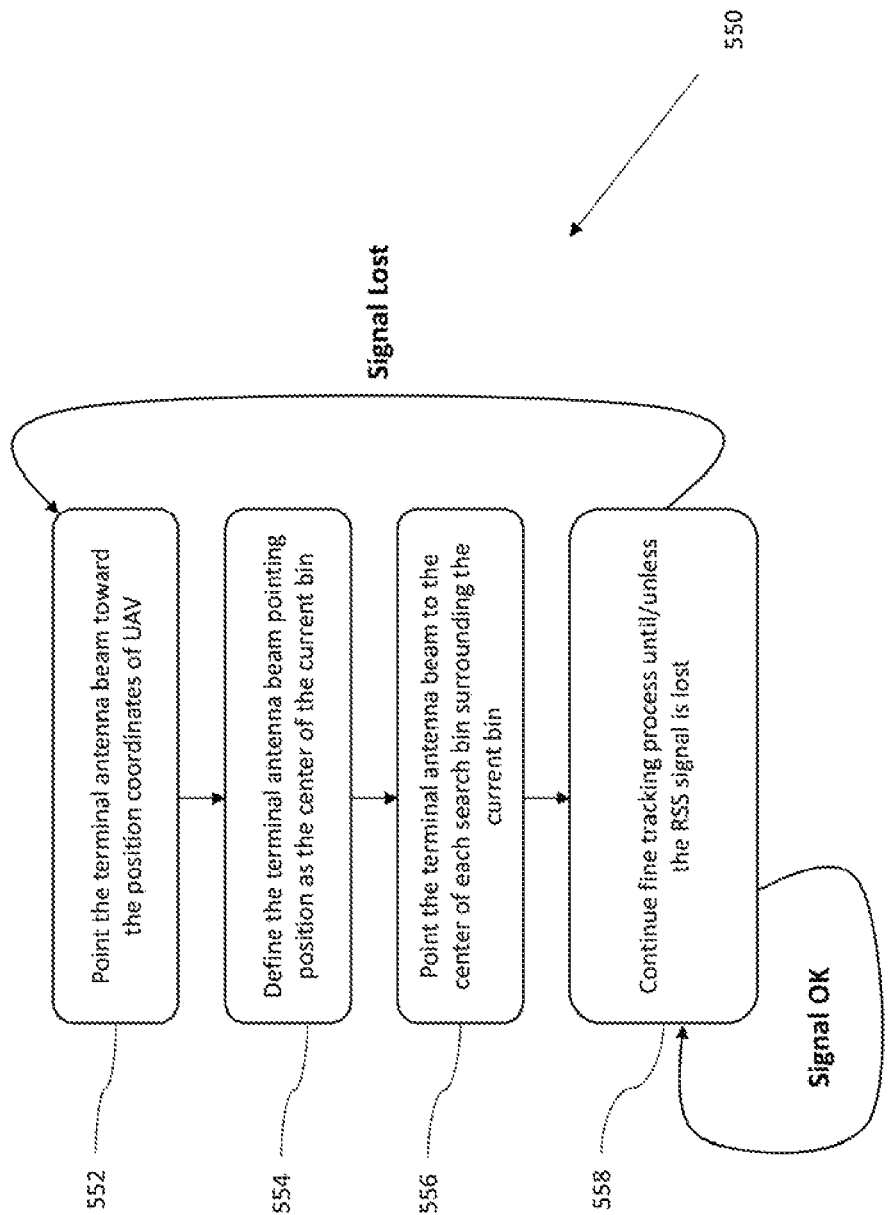
FIG. 5A is an exemplary flow chart of a method for fine tracking of the UAV position, consistent with the various principles described herein.

FIG. 5A illustrates one exemplary embodiment of the method 550 for fine tracking of the UAV position. As shown, at step 552 of the method 550, the ground terminal points the terminal antenna beam toward the position coordinates of UAV that are found via coarse tracking (e.g., either independently determined, or received from the UAV, peer device, etc.)

At step 554 of the method 440, the ground terminal defines the terminal antenna beam pointing position as the center of the current bin, and specifies a number of search bins surrounding the current bin which can be searched for a higher signal RSS level. A search pattern may also be prescribed, which may be symmetrical or asymmetric (or combinations thereof).

At step 556 of the method 550, the ground terminal points the terminal antenna beam to the center of each search bin surrounding the current bin (or implements an alternate search pattern) and measures the RSS of the UAV in each bin until/unless a bin with a stronger RSS is found. In one such variant, the terminal further adjusts the bin center position to account for the change in the position coordinates of the UAV (due to the UAV's movement and/or other atmospheric effects) when pointing from one bin to the next. When a bin with a stronger RSS is found, then the stronger bin replaces the current bin as the new current bin. In order to reduce inefficient "churn" effects, in one implementation, the terminal may only replace the current bin when the stronger bin has a sufficiently stronger signal (e.g., when the stronger RSS comprises a certain percentage over die next stronger signal), and/or based on one or more persistence criteria (e.g., where the stronger bin has remained stronger for a sufficient measurement interval).

At step 558, the fine tracking process is continued until/unless the RSS signal is lost. If the signal is lost, then the process will fall back to the coarse UAV detection phase (see also UAV Detection and Coarse Tracking Using Signals Received from the UAV). In some cases, loss may be determined according to a pre-determined minimum RSS threshold; e.g., if the RSS falls below die minimum threshold (e.g. for a prescribed period of time), then the UAV is deemed "lost." In other cases, loss may be based on a steering limitation; for example, where the antenna nears the limit of its steering capability, the ground terminal may pre-emptively drop the UAV in favor of finding a replacement UAV. Still other schemes for identifying a loss condition may be based on quality of service or available bandwidth (e.g., where a UAV has sufficient signal strength but is too congested for use, etc.). Various other loss conditions will be readily appreciated by those of ordinary skill in the related arts, given the contents of the present disclosure.

The foregoing beam steering algorithm may additionally use an encoder device to compensate for pointing error due to e.g., motor backlash (errors caused by gaps between the components of the motor and/or other calibration related errors), wind effects, encoder tolerance, etc. In one such implementation, the encoder is a motion tracking device that is attached to the motors that point the ground terminal antenna, and that keeps track of the difference between the amount the antenna should have moved based on the movement commands issued to the motors by the motor controller, and how much the antenna actually moved, the difference being due to artifacts (such as the motor backlash). Accurate encoders are expensive and may not be as effective as the RSS based correction scheme; however, some use scenarios may use an encoder to compensate for the motor backlash where the RSS based correction scheme is undesirable (due to e.g., limited search capabilities, processing burden, network overhead, and/or other operational restrictions.)

In still other variants, non-mechanical steering mechanisms may be used where there are other design considerations (e.g., space, cost, performance, and/or power) that preclude or otherwise render mechanical implementations undesirable. Common examples of non-mechanical steering mechanisms include without limitation electronic beam forming techniques, and phased array configurations.

UAV Antenna Pointing toward Ground Terminal

Referring now to the UAV, in some embodiments the UAV may also perform antenna pointing toward the ground terminal. As previously described (see e.g., FIG. 1), data traffic to and from ground terminals are routed through the UAV e.g., to and from the gateway terminal, and/or to and from the Internet. In one exemplary implementation, the UAV antenna that is used by the UAV to communicate with the gateway is a two (2) axis mechanically steerable antenna.

In one exemplary embodiment, the UAV radio sub-system receives or is pre-programmed with (or otherwise acquires) the position coordinates of a target terminal (i.e., the ground terminal or gateway that is the target of the UAV antenna beam). In one variant, the UAV radio sub-system uses its onboard real-time UAV position location and orientation sub-system (such as the gyroscope/accelerometer/global positioning system (GPS) sub-system 319 of FIG. 2A) to point the UAV antenna toward the position coordinates of the gateway terminal. More directly, the UAV's antenna pointing is based in this embodiment on the position coordinates of a target terminal, and the UAV's own internally monitored (or externally supplied) position and orientation.

Figure 5B:
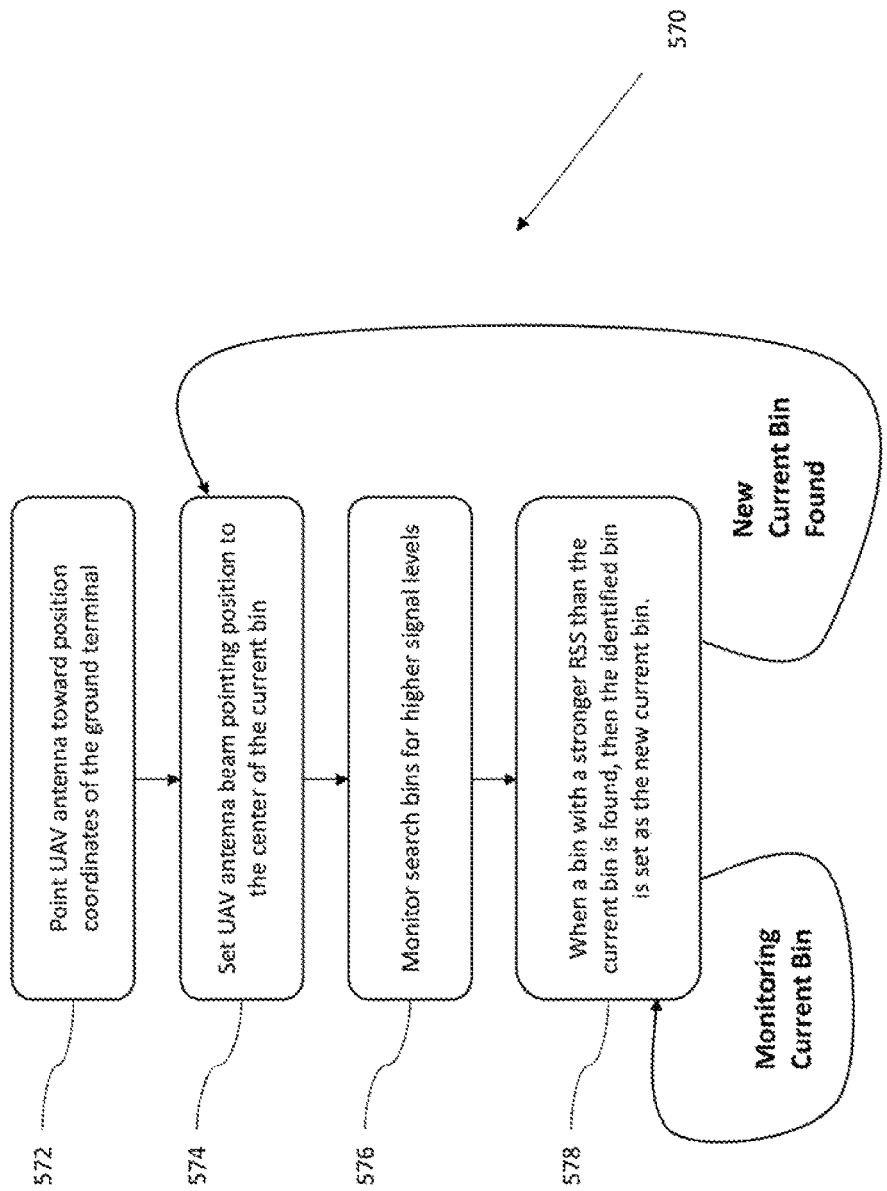
FIG. 5B is an exemplary flow chart of a method for initial "coarse" ground terminal detection and subsequent "fine" UAV beam steering toward the ground terminal, consistent with the various principles described herein.

Various systems and methods for gateway terminal detection may he used by the UAV radio sub-system. FIG. 5B illustrates one exemplary embodiment of a method 570 for initial "coarse" ground terminal detection and subsequent "fine" UAV beam steering toward the ground terminal.

At step 572 of the method 50, during the ground terminal detection phase, the UAV points the UAV antenna toward position coordinates of the ground terminal using the position coordinates and orientation of the UAV obtained from the UAV on-board GPS/gyroscope; sensor sub-system and the ground terminal position coordinates. As previously noted, the ground terminal position coordinates may be acquired in a variety of ways, including without limitation, direct messaging (as received from the ground terminal), indirect messaging (as received from e.g., a peer UAV, network management entity, or other out-of-band link), and/or pre-stored location information.

At step 574, the UAV sets the UAV antenna beam pointing position to the center of the current bin of the ground terminal, and specifies a number of search bins surrounding the current bin. In some cases, the bins are regularly shaped. In other cases, the bins are irregularly shaped so as to e.g., compensate for UAV movements, improve coverage, or accommodate other network considerations.

At step 576 of the method 570, the UAV monitors the search bins for higher signal levels (e.g., due to changes in positions, weather, etc.) In one embodiment, the UAV points the UAV antenna beam to the center of each of the bins surrounding the current bin and measures a ground terminal RSS in each bin.

At step 578, when a bin with a stronger RSS than the current bin is found, then the identified bin is set as the new current bin. Additionally, the UAV may need to adjust the bin center position to account, for the change in the new position coordinates and orientation of the UAV when pointing from one bin to the next. The search bins are monitored (e.g., continually, or periodically, and/or based on detection of an event) during operation; however if the ground terminal signal is lost, then the UAV will repeat the coarse ground terminal detection (returning back to e.g., step 572). Artisans of ordinary skill in the related arts will readily appreciate, given this disclosure that various other implementations may use the RSS of the signals received by the UAV radio sub-system (or any other signal quality metric) from the gateway terminal to detect the gateway terminal with equivalent success.

Various implementations of the foregoing beam steering algorithms may use an encoder device to compensate for pointing error due to e.g., motor backlash, wind effects, angular tolerance of the encoder, etc. In one such implementation, the encoder is a motion tracking device that is attached to the motors that point the UAV antenna, and that keeps track of the difference between the amount the antenna should have moved (based on e.g., the movement commands issued to the motors by the motor controller), and how much the antenna actually moved, the latter diverging from the former due to artifacts (such as the aforementioned motor backlash or other influences).

Methods

Figure 6:
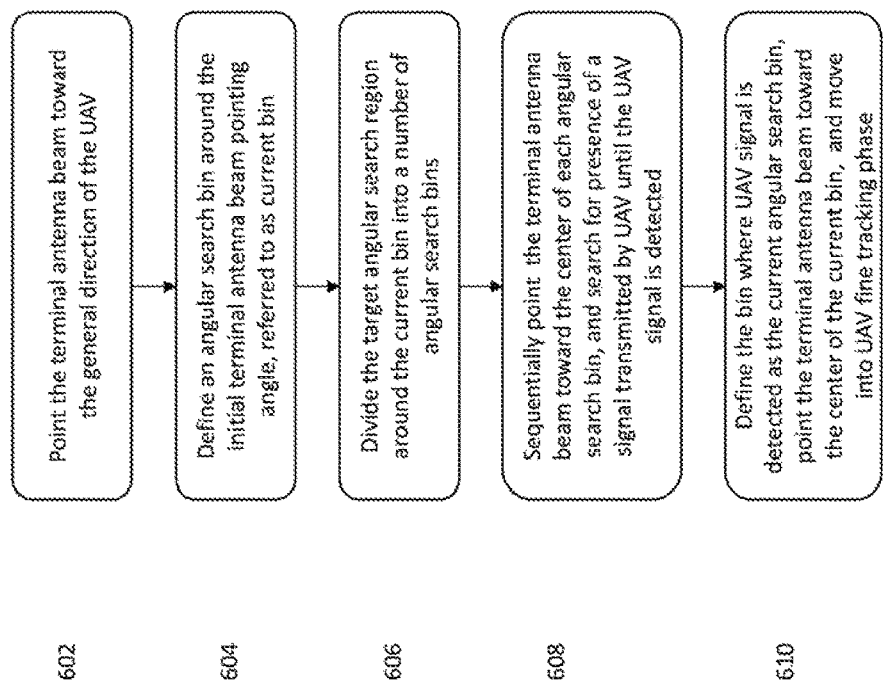
FIG. 6 is an exemplary flow chart of the coarse UAV detection procedure used by ground terminals to adjust their beams toward the UAV to detect a signal sent by the UAV.

Referring now to FIG. 6, a flow chart of an exemplary process used to detect the UAV during the coarse UAV detection phase is shown. In step 602, the terminal antenna beam is pointed toward the general direction of the UAV. In one embodiment, the accurate position or location of the UAV is unknown, and thus the location of UAV is estimated. In another embodiment, at least portions of real-time (i.e., accurate) UAV position coordinates may be known by the terminal's antenna sub-system. Hence, limited information on the position or location of the UAV may be available, in step 604, one angular search bin with certain azimuthal and elevation angles, is referred to as and defined as a "current angular search bin," "current search bin" or a "current bin" based at least on the angular position toward, which the terminal antenna is pointing after step 602 (initial pointing of terminal antenna in general UAV direction).

In step 606, a target angular region around the current angular search bin is divided into a number of angular search bins. The target region covers the possible location(s) of the UAV and is where the UAV may reside. The size of each of the divided angular search bins is defined to be ideally the same as that of the current bin to, e.g., enable consistent signal quality measurement. In the exemplary embodiment as discussed above for FIG. 4 for instance, the current bin and the divided angular search bins may include bins 1 through 37 of substantially equal sizes. In step 608, the terminal radio sub-system points its antenna beam toward the center of each angular search bin and searches for a reference signal transmitted by the UAV until the UAV signal is detected. The pointing may proceed in a particular sequence, based on a predetermined, path or another arrangement. In step 610, the angular search bin where the UAV signal is detected is defined as the current angular search bin and the process is moved to the UAV fine tracking phase.

Proceeding to FIG. 7, a flow chart of an exemplary process of the fine UAV tracking phase is shown. The process, as described in further detail below, is used to more accurately steer the terminal antenna beam toward the UAV. In step 702, an angular search bin is defined around the angular position where the terminal antenna beam is pointing at the conclusion of the coarse UAV detection phase. This angular search bin is referred to as the (new) current angular search bin. In step 704, the angular search region around the bin where the UAV was detected during UAV detection phase is divided into a number of new smaller angular search bins for the UAV tracking phase and is configured into a search bin list. For example, the angular search bins may include bins 1 through 7 as in the example of FIG. 5.

In step 706, the terminal antenna beam is sequentially pointed toward the center of each angular search bin, UAV signal quality such as RSS or other metrics to measure signal quality is measured in each bin, and the bin with the largest signal quality is again chosen as the new current bin. In step 706, a time counter is initialized to track the time elapsed since choosing the new current bin or remaining until the current angular search bin is updated. In step 708, the terminal antenna beam remains fixed on the current bin angular position (previously determined in step 704) for data communication, and the time counter is adjusted (e.g., incremented or decremented). In step 710, if the time counter is above or below a certain threshold, the process moves again to step 706 to update the current angular search bin by, inter alia, evaluating the bin with the largest; signal quality. Otherwise, the process moves to step 708, i.e., the terminal antenna beam remains fixed on the current bin angular position without an update.

In another embodiment of the fine tracking process of the UAV position, once the terminal antenna beam is pointed toward the UAV accurately enough to be able to detect data packets sent by the UAV, then the UAV radio sub-system may periodically send the UAV real-time position coordinates of the UAV to the terminals. The terminal radio sub-system may then steer the terminal's antenna beam toward the UAV's position using the real-time position coordinates of the UAV. In other words, the coarse UAV defection is carried out using the RSS measurements made on the signals received by the ground terminal from, the UAV radio sub-system, and the fine ground terminal beam steering toward the UAV is carried out using UAV position coordinates that are periodically updated by the UAV and conveyed direct communications (or indirectly via out-of-band communications) with the ground terminals. When tracking tire UAV solely based on the real time UAV position coordinates, artifacts (such as the ground terminal motor backlash and wind loading) may result in cumulative antenna pointing errors that can result in a deviation of the ground terminal antenna pointing from the true (or expected) position coordinates of the UAV. Such errors mas be further improved by adding an RSS based antenna pointing correction (such as was previously described).

In some implementations, there may be a substantial propagation delay from the time the UAV measures its own GPS position and transmits the measurements to the ground terminal, and the time when the ground terminal actually receives the updated UAV GPS measurements and makes adjustments to the terminal antenna beam pointing. Since the UAV is moving during the delay, the updated measurements will lag the UAV's actual location, resulting in a pointing error (due to the difference between the UAV position when GPS was last measured and the actual position of the UAV when the antenna beam adjustment is made). The pointing error can be inferred from the speed and the heading (direction) of the UAV (which may either be directly provided by the UAV or otherwise tracked by the ground terminal). Based on the speed and direction of the UAV, the position of the UAV may be estimated, and a correction can be made to the terminal beam pointing to account for distance the UAV has traveled since the UAV GPS position was last measured.

It will be appreciated that while certain aspects of the invention are described in terms of a specific sequence of steps of a method, these descriptions are only illustrative of the broader methods of the invention, and may be modified as required by the particular application. Certain, steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A ground terminal apparatus comprising:
   a non-mechanical antenna steering mechanism configured to steer one or more antenna beams toward an unmanned aerial vehicle (UAV);
   a processor apparatus; and a non-transitory computer readable medium configured to store one or more instructions, the one or more instructions when executed by the processor apparatus, are configured to cause the ground terminal apparatus to:
coarse detect a presence of the UAV within a search space;
steer the one or more antenna beams using the non-mechanical antenna steering mechanism toward the detected presence of the UAV within the search space; and
fine track a current position of the UAV within the search space, wherein the fine track of the current position of the UAV is configured to:
define a plurality of search bins around a current bin associated with the current position of the UAV, the plurality of search bins including the current bin;
measure a signal quality for each of the defined plurality of search bins; and
when the measured signal quality of a searched bin exceeds a measured signal quality of the current bin, set the searched bin to an updated current bin for a subsequent fine track iteration.

2. The ground terminal apparatus of claim 1, wherein the non-mechanical antenna steering mechanism comprises an electronic beam forming apparatus.

3. The ground terminal apparatus of claim 1, wherein the non-mechanical antenna steering mechanism comprises a phased array apparatus.

4. The ground terminal apparatus of claim 1, wherein the non-mechanical antenna steering mechanism comprises logic configured to switch to an antenna aperture associated with the searched bin from an antenna aperture associated with the current bin.

5. The ground terminal apparatus of claim 1, wherein the plurality of search bins comprise angular search bins.

6. The ground terminal apparatus of claim 5, further comprising an antenna subsystem that utilizes a first angular search bin size to coarse detect the presence of the UAV within the search space.

7. The ground terminal apparatus of claim 6, wherein the antenna subsystem is configured to use a second angular search bin size to fine track the presence of the UAV within the search space, wherein the second angular search bin size is smaller in size than the first angular search bin size in at least one dimension.

8. The ground terminal apparatus of claim 7, wherein the antenna subsystem utilizes the second angular search bin size to fine track the presence of the UAV within the search space, the second angular search bin size is more accurately positioned towards a position of the UAV than the first angular search bin size.

9. The ground terminal apparatus of claim 7, wherein the at least one dimension is selected from the group consisting of azimuth and elevation.

10. An unmanned aerial vehicle (UAV) apparatus comprising:
an antenna steering mechanism configured to point one or more antenna beams towards a ground terminal;
a processor apparatus; and
a non-transitory computer readable medium configured to store one or more instructions, the one or more instructions, when executed by the processor apparatus, configured to cause the UAV apparatus to:
coarse detect a presence of the ground terminal based on one or more position coordinates;
point the one or more antenna beams toward the one or more position coordinates; and
fine track a current position of the ground terminal, wherein the fine track of the current position of the ground terminal is configured to:
define a plurality of search bins around the current position, the plurality of search bins including a current bin;
measure a signal quality for each of the plurality of search bins; and
when the measured signal quality of a searched bin exceeds a current signal quality of the current bin, set the searched bin to an updated current bin for a subsequent fine track iteration.

11. The UAV apparatus of claim 10, further comprising instructions that, when executed by the processor apparatus, cause the UAV apparatus to repeat the coarse detection of the presence of the ground terminal when communications with the ground terminal are lost.

12. The UAV apparatus of claim 10, wherein the antenna steering mechanism comprises an electronic beam forming apparatus with beam forming capability in at least one axis.

13. The UAV apparatus of claim 12, wherein the antenna steering mechanism further comprises logic configured to switch to an antenna aperture associated with the searched bin from an antenna aperture associated with the current bin.

14. The UAV apparatus of claim 10, wherein the antenna steering mechanism further comprises logic configured to shape the one or more antenna beams into one of the plurality of search bins.

15. The UAV apparatus of claim 14, wherein the plurality of search bins are regularly shaped.

16. The UAV apparatus of claim 14, wherein the one or more antenna beams are irregularly shaped to improve coverage of at least one of the plurality of search bins.

17. The UAV apparatus of claim 16, wherein the one or more antenna beams are irregularly shaped to improve coverage of the searched bin.

18. A method for antenna pointing, the method comprising:
coarse detecting a target terminal within a search space;
steering one or more antenna beams toward the search space; and
fine tracking a current position of the target terminal within the search space by:
defining a plurality of search bins around the current position, the plurality of search bins including a current bin;
measuring a signal quality for each of the plurality of search bins;
when the measured signal quality of a searched bin exceeds a current signal quality of the current bin, setting the searched bin to an updated current bin for a subsequent fine track iteration; and
repeating the coarse detection of the target terminal when the target terminal is lost.

19. The method of claim 18, wherein the method further comprises changing an angular size of at least one bin of the plurality of search bins.

20. The method of claim 18, wherein the method further comprises changing a shape of at least one bin of the plurality of search bins.

* * * * *